3,034,995
SILICA-ALUMINA HYDROGEL-KAOLINITE CATALYSTS AND PROCESSES FOR PREPARATION THEREOF
David G. Braithwaite, Chicago, Edwin H. McGrew, Riverside, William P. Hettinger, Jr., Dolton, and Joseph S. D'Amico, Westchester, Ill., assignors to Nalco Chemical Company, Chicago, Ill., a corporation of Delaware
No Drawing. Filed June 29, 1959, Ser. No. 823,341
5 Claims. (Cl. 252—455)

This invention, in general, relates to improvements in the process of manufacture of silica-alumina hydrogel catalysts containing clay, notably kaolinite, and to improved cracking catalyst manufactured thereby. This application is a continuation-in-part of our copending application Serial No. 713,520, filed February 6, 1958.

Synthetic silica-alumina hydrogel cracking catalysts are extensively employed in the production of gasolines by catalytic cracking processes. In general, catalytic cracking processes may be described as (1) fixed bed processes, (2) moving bed processes, or (3) fluid bed processes. In the fixed bed processes macrosized catalyst particles are placed in a column and the gases or vapors to be cracked are passed therethrough. Similar catalyst bodies are used in the moving bed process wherein the catalyst bed is moved slowly through the cracking unit. In the fluid bed process, known as "fluidized cracking," fine catalyst particles remain suspended in the gas or vapor stream and are maintained in a fluidized state.

In fixed and moving bed cracking, macrosized particles in the form of pellets or tablets are used and these particles are subjected to stresses from the weight of the catalyst disposed above them and the pressures used in the process. These macrosized particles, therefore, must be physically strong and resistant to attrition.

In the fluidized cracking processes, the catalyst particles are preferably used in the form of microspheres which are sufficiently fine to pass through a 100 mesh screen and preferably have a particle size within the range of 20 to 120 microns. Since the catalyst particles are maintained in a fluidized state, the movement of the particles creates an attrition problem. Synthetic silica-alumina microspheres have been found to be especially useful in fluidized cracking but they are extremely hard and have brittle properties similar to glass so that there is a tendency for such catalyst particles to be broken into finer particles as a result of the constant agitation in the fluidized cracking process. Extremely fine particles which are produced in this manner are sometimes lost from the cracking unit with regenerator stack gases and such loss must be replaced by the addition of fresh catalyst.

The catalysts derived from natural sources have an economic advantage due to the fact that the raw material costs are less but these natural raw materials leave much to be desired in the preparation of microspheres suitable for use in fluidized cracking processes. Furthermore, their physical properties are not all that may be desired, even in fixed bed catalytic processes.

The present invention is primarily concerned with the production of an economical cracking catalyst composed of clay, notably kaolinite, which is incorporated into a synthetic silica-alumina hydrogel. The catalysts produced in accordance with our invention are at least substantially equivalent in cracking activity and important physical properties to silica-alumina hydrogel catalysts known in the art, and in some areas significant improvements have been noted.

Briefly, our process involves the chemical combination of a peptized slurry of kaolinite particles with a silica-alumina hydrogel precursor prior to gelation and drying thereof. Kaolinite is inexpensive and readily available. We have found, for reasons explained hereafter, that kaolinite is the best type of clay for these catalysts, considering all factors. By peptizing the kaolinite in aqueous slurry prior to chemical combination of the slurry with the silica-alumina hydrogel precursor prior to gelation and drying and by carefully observing subsequently defined critical conditions during the manufacturing process, there is produced a catalyst which has the following advantageous physical differences and notably superior catalytic properties over typical synthetic silica-alumina hydrogel cracking catalysts and also natural clay cracking catalysts.

The catalyst particles produced by our process appear to have, based on measurements of surface area, pore volume and pore diameter, a large feeder pore network throughout the catalyst particles. This larger feeder pore network provides easier access to and egress from localized cracking centers inside the catalyst particles by oil feed and cracked product, respectively, in the cracking operation, as well as by air and combustion product, respectively, in the catalyst regeneration process. Our measurements also indicate that the pore diameters in the synthetic silica-alumina hydrogel portion of the cracking catalyst are also larger than those in a typical silica-alumina hydrogen cracking catalyst without incorporated kaolinite.

As a result of this pore structure, the catalysts of our invention in microspherical form have proven to have good cracking activity stability in fluidized bed cracking operations. Cracking activity stability of our catalyst was somewhat better than a typical silica-alumina hydrogel without incorporated kaolinite.

A surprising property of our catalysts is their resistance to attrition. Silica-alumina hydrogel catalysts without incorporated clay normally have a high attrition index. As pore diameter increases, the attrition index of silica-alumina hydrogel catalysts normally becomes higher. Our improved catalysts, on the other hand, have better attrition resistance than synthetic alumina hydrogel catalysts without incorporated clay even though the average pore diameter of our catalysts is substantially larger. The improvements in pore diameter and attrition resistance afforded by our herein-disclosed invention provide significant advantages in microspherical catalysts used in fluidized bed cracking processes and also in macrosize catalyst shapes such as pellets, rods, or tablets used in fixed or moving bed catalytic cracking processes, as well as in catalyst bodies wherein the hydrogel-clay composition is the support for the active catalyst.

Other advantages of our invention observed during cracking processes relate to improvements in thermal and steam stability of our catalysts in comparison with typical silica-alumina hydrogel cracking catalysts without incorporated clay. Catalyst life is improved as a result of low attrition. Also, there is less coke-make with our catalysts than with said typical silica-alumina hydrogel catalysts. Our catalysts also appear to be more resistant to metals poisoning by detrimental metals such as iron, vanadium and nickel.

It is, therefore, an object of our invention to provide improvements in the process of manufacture of catalyst bodies consisting primarily of silica and alumina.

Another object of our invention is to provide improvements in the process of manufacture of cracking catalysts.

Another object is to provide an economical cracking catalyst with improved physical properties.

Still another object is to provide an economical cracking catalyst having improved cracking activity stability.

A further object is to provide improvements in processes for manufacture of cracking catalysts to provide catalysts having the aforementioned advantages over typical silica-alumina hydrogel cracking catalysts known in the art.

An additional object of the invention is to provide a process for the manufacture of catalysts wherein a silica-alumina material derived from natural sources is intimately dispersed with a reactant used in preparing a synthetic silica-alumina hydrogel prior to the formation of the hydrogel.

Another object of the invention is to provide a new and improved process of manufacturing compositions consisting essentially of silica and alumina wherein the end product consists of microspherical particles made up of silica and alumina derived both from synthetic and natural sources. Other objects will appear hereinafter.

These objectives are accomplished in accordance with this invention by chemically combining kaolinite with a synthetic silica-alumina hydrogel precursor prior to gelation and drying of the latter. For the purpose of the invention, the kind, particle size and amount of the clay employed, are important.

The kaolinite used in the practice of the invention contains about two mols of $SiO_2$ per mol of $Al_2O_3$. It has a crystalline structure which is planar and hexagonal. The average longest dimension of the hexagonal particles varies within the range of 0.1 to 20 microns and the particles are relatively thin, the thickness usually being less than one-tenth of the longest dimension.

Kaolinite of this type is found particularly in Georgia and also in other parts of the United States. The kaolinite crystals are prepared for use in the present invention by conventional methods which involve such well known steps as blunging with water, adding a polyphosphate such as sodium hexametaphosphate to keep the clay in suspension, screening out quartz, centrifuging, washing with sulfuric acid, for example at a pH of 3.5, bleaching and flocculating with small amounts of various types of flocculants such as alum, filtering, drying and grinding. Iron and titanium are often present in natural clays, e.g., as ilmenite, and a large part of this is removed during the centrifuging.

The kaolinite used in the practice of this invention are preferably unleached high purity clays containing not more than 0.4% by weight of iron. The presence of iron in a catalyst tends to produce hydrogen formation during cracking, particularly if the iron content of the clay exceeds about 0.4% by weight. For some purposes, of course, the presence of higher concentrations of iron in the resultant composition may not be objectionable.

Kaolinites are usually segregated into particle size ranges, such as for example by centrifuging, air floating or settling. Two commercially available products, "premax" and "hydrite" are examples of fine and coarse grades of clay. "Premax" has a particle size such that 10% by weight is less than 0.2 micron, 50% by weight less than 0.6 micron, and 90% by weight less than 1.6 microns. "Hydrite" is typical of a coarse clay. Its particle size distribution will have about 10% by weight of the particles less than 0.6 micron, 50% by weight less than 5.2 microns, and 90% by weight less than 20 microns. The above descriptions are illustrative only and are not intended as being limitations.

The quantity of clay incorporated into the silica-alumina hydrogel is such that the resultant catalyst contains, on a dry basis, 30–60% by weight of kaolinite and 70–40% synthetic silica-alumina hydrogel. Excellent catalysts are produced with the kaolinite constituting 40–50% by weight of the catalyst (dry basis). The synthetically derived silica-alumina hydrogel portion of the catalysts of our invention contain, on a dry basis, 55 to 95% by weight of silica, calculated as $SiO_2$, and 5 to 45% by weight of alumina, calculated as $Al_2O_3$.

The kaolinite is chemically combined and intimately dispersed in the synthetic silica-alumina hydrogel precursor at a stage prior to gelation and drying of the hydrogel. The kaolinite is incorporated by forming an aqueous kaolinite slurry containing 2 to 15% kaolinite by weight. In order to obtain maximum dispersion of the kaolinite in the water, a small amount of a peptizing reagent is added to the slurry, and the slurry is agitated until the kaolinite crystals are dispersed uniformly in the water. The peptizing of the kaolinite is an important step in production of catalysts having the activity and properties heretofore described. The preferred peptizing agent is a small amount of sodium silicate by which the kaolinite slurry is peptized prior to incorporation of the slurry in the hydrogel manufacturing process. Sodium silicate is preferred because it is also the compound used to provide the silica portion of the synthetic hydrogel and thus no foreign or contaminating chemicals are added for purposes of peptizing the kaolinite. Also, it is believed that sodium silicate as the peptizing agent forms a sodium silicate coating about each finely dispersed kaolinite particle. When the kaolinite slurry is mixed with the remainder of the sodium silicate solution used to form the silica hydrogel, the kaolinite flocs. It is believed that the sodium silicate coated on the kaolinite particles during peptizing remains on each particle upon floccing, whereby it is available on each small kaolinite particle to serve as a nucleus for attachment of the silica-alumina hydrogel to the kaolinite particles. Without intending to be limited thereto, we suggest the foregoing theory as a possible explanation for the improvements noted in the catalysts of our invention prepared by using the peptizing step.

The peptized kaolinite slurry preferably is combined with a gel precursor, e.g., sodium silicate solution, whereby the kaolinite is dispersed in the precursor solution prior to gelation of the silica or alumina. The peptized kaolinite slurry can be incorporated into the synthetic hydrogel at other stages in the manufacture thereof, however, such as by intimately mixing a peptized kaolinite aqueous slurry into a wet synthetic silica-alumina hydrogel formed in the absence of kaolinite prior to drying of said hydrogel.

While we prefer to use a small amount of sodium silicate as the peptizing agent, other peptizing agents for clays such as the glossy polyphosphates, e.g., sodium hexametaphosphate, or other peptizing agents for clay known in the art can be employed. Care must be exercised in selection of said peptizing agent, however, to avoid introduction into the catalyst of elements which have an undesired catalytic effect.

Our process, which will afford a catalyst having the aforementioned advantages and properties, is conducted in the following manner. To a batch tank is added a calculated quantity of water which is preheated to a temperature in the range of about 80–122° F.—the temperature being governed by considerations hereinafter outlined. Agitation is begun, and a weighed amount of kaolinite is added to the water while continuing agitation. The kaolinite concentration in the thus formed aqueous slurry, in this instance, will be in the range of 2 to 8% by weight. Determination of the weight of kaolinite is on a dry solids basis. The kaolinite does not disperse as fine crystals solely by agitation of the slurry, and a small amount of sodium silicate solution, sufficient only to peptize the kaolinite and thereby disperse it uniformly as fine crystals, is added with the slurry under agitation. Agitation is continued until the kaolinite is peptized, 5–15 minutes normally being adequate. The amount of sodium silicate added to peptize the kaolinite is in the range of about 0.1–0.8% of the kaolinite, the latter being on a dry basis.

After the kaolinite is finely dispersed in the aqueous slurry, sodium silicate solution is mixed into the slurry. The concentration of the sodium silicate solution is correlated with the amount of water of the aqueous slurry to give a concentration of sodium silicate, determined on a weight basis of the batch up to this point of the process but exclusive of the weight of kaolinite, of 4–6%, expressed as $SiO_2$.

Before acid is added to gel the sodium silicate as the silica hydrogel, the temperature of the kaolinite slurry containing all the sodium silicate is checked. The temperature of said slurry is critical at this stage of the process in order to obtain a catalyst having the proper pore volume. Pore volume of the catalyst should be in the range of 0.5–0.9 cc./gm., as determined by the water titration method. This temperature should be in the range of 80–122° F. for slurries containing 4–6% $SiO_2$, said percent being determined exclusive of the weight of the kaolinite, as defined supra, with the further qualification that the temperature be in the lower part of said range at 6% $SiO_2$, in the middle part of said range at 5% $SiO_2$ and in the upper part of said range at 4% $SiO_2$. As a guide to selection of the optimum temperature, the temperature should be in the range of 97–122° F. at 4% $SiO_2$, 90–115° F. at 5% $SiO_2$, and 80–100° F. at 6% $SiO_2$. Silica concentrations at decimal figures between 4% and 5% or 5% and 6% can be determined by interpolation of said values or by graphically plotting said temperature values versus the corresponding silica concentrations, and selecting, at the percent $SiO_2$ employed, a temperature in the area covered on said graph by lines outlining the plotted coordinates. For example, at a 4.7% $SiO_2$, the optimum temperature range is about 95–120° F.

After all of the sodium silicate is mixed with the kaolinite slurry, a strong acid, preferably sulfuric acid of 20–50% strength, is added over a period of 30–90 minutes. The acid is preheated to a temperature in the range of 130–190° F. The silica gel will begin to form within 30–60 minutes after acid addition begins. The batch is agitated for 5–15 minutes after the last acid is added. The amount of acid added should be sufficient to give a batch pH in the range of 7.0–9.5.

The batch is permitted to age for at least 30 minutes after gel formation begins. Aging for at least this period is important to develop the desired pore volume of the ultimate catalyst. The upper limit of the aging period is not particularly critical because the resulting pore volume does not change appreciably with aging periods longer than the 30 minutes.

Alum is then added to the aged silica gel as a 5–14% solution by weight, expressed as $Al_2O_3$, in a period of 20–50 minutes. After all the alum solution is added, the batch is agitated for 5–15 minutes. Then an aqueous solution of 2–12% by weight of sodium aluminate, as $Al_2O_3$, is added over a period of 10–40 minutes. The batch is allowed to stand for at least 5 minutes after all the sodium aluminate solution has been added. The ratio of alum to sodium aluminate is adjusted so the resulting batch has a pH in the range of 4.5–6.0, preferably 5.0–5.5 and the quantity of alumina gel in the final catalyst is in the desired proportion with respect to the silica gel. Potassium aluminate or calcium aluminate may be used in place of sodium aluminate.

The resulting gel is then filtered on a dewatering filter. Aqueous gel and filter cake from the dewatering filter are blended, if necessary, to give a solids content in the blended mixture of 8–18%. A solids content of this value is important at this stage of the process when the ultimate catalyst is spray-dried microspheres having an average diameter of 20–100 microns. This gel slurry is then homogenized in a homogenizing mill, and then spray-dried in a spray-drier at a solids outlet temperature of 240–280° F. The spray-dried catalyst is washed sequentially with dilute sulfuric acid, aqueous ammonia, and water to remove sulfate and sodium ions, and the washed catalyst is then flash-dried at a solids outlet temperature of 300–300° F.

In an alternative, though less preferred process, the silica-alumina hydrogel is prepared by previously described method, and the aqueous, kaolinite slurry is blended into the silica-alumina hydrogel just prior to dewatering of the gel.

The following examples are given to illustrate preferred specific embodiments of our generic invention herein disclosed.

*Example 1*

A silica-alumina hydrogel-clay cracking catalyst in microspherical form of an average particle diameter in the range of 20–100 microns is prepared by the following technique to give a catalyst composed of 40% kaolinite and 60% synthetic silica-alumina hydrogel, of which 75%, expressed as $SiO_2$, is silica and 25%, expressed as $Al_2O_3$, is alumina.

To a batch tank is added 6,935 gallons of water preheated to 107° F. After agitation is begun, 3280 lbs. of kaolinite having a particle size wherein 90% by weight is less than 1.6 microns and containing 85% solids is mixed therein. Two gallons of sodium silicate solution (28.5% weight percent $SiO_2$, 40–41.5 Baumé at 68° F. and $Na_2O:SiO_2$ ratio of 1:3.2) is added to the kaolinite slurry. The batch is stirred for ten minutes, and 960 gallons of said sodium silicate solution is added. The batch is stirred for five minutes, and the temperature is checked to be certain it is 107° F. The concentration of the sodium silicate, as $SiO_2$, in the batch is 4.7 weight percent, excluding in the calculations the weight of the kaolinite.

With the batch at 107° F., 334 gallons of 35 weight percent sulfuric acid solution heated to 160° F. are added over a period of 55 minutes. The gel forms about 42 minutes after acid addition is begun. The batch is agitated for five minutes after all the acid has been added. Then the pH is adjusted to 8.5 to 9, and the gel is permitted to age for 30 minutes after gel formation began.

Then 490 gallons of alum (7.8 weight percent, as $Al_2O_3$) is added to the gel over a period of about 30 minutes. The batch is agitated for an additional five minutes whereupon 180 gallons of sodium aluminate solution (23.8 weight percent as $Al_2O_3$) diluted in 720 gallons of water is added over a period of 15 minutes. After all the sodium aluminate is added, the pH is checked. It should be between 5.2 and 5.4.

The aqueous gel is then pumped to a dewatering filter, and the filter cake from said dewatering filter and a portion of aqueous gel are blended to give a gel slurry of 14 weight percent solids. This slurry is pumped through a homogenizing mill whereafter it is spray-dried at a solids outlet temperature of 250° F. The spray-dried catalyst is washed with dilute sulfuric acid, aqueous ammonia, and water, in succession, over three filters. The washed catalyst microspheres are then flash-dried at a solids outlet temperature of 350° F.

*Example 2*

A synthetic silica-alumina hydrogel is prepared in accordance with the procedure of Example 1, but the sodium silicate-peptized, aqueous, kaolinite slurry containing 10% by weight kaolinite is blended into the silica-alumina hydrogel just prior to dewatering on the dewatering filter. The kaolinite slurry and hydrogel are agitated for 15 minutes after they have been blended together.

The following observations have been made in catalytic cracking operations on comparable feed stocks with the microspherical catalyst of Example 1 in comparisons made with a microspherical synthetic silica-alumina cracking catalyst without incorporated kaolinite and containing 87 weight percent $SiO_2$ and 13 weight percent $Al_2O_3$.

The catalyst of Example 1 is manufactured at considerably less cost than the 100% synthetic hydrogel catalyst. The apparent bulk density of the catalyst of Example 1 was much more stable than the 100% hydrogel catalyst. The bulk density of the former increased very slowly during use, and the change in the apparent bulk density of the virgin catalyst when it was used in the catalytic cracker was appreciably less than the corresponding charge of the 100% synthetic hydrogel catalyst. The catalyst of Example 1 was determined by surface area and water titration and $N_2$ condensation measurements to have a 30–50% larger pore diameter and said measurements indicated a dual pore structure in the catalyst of Example 1.

Examination of catalyst addition rates over an equivalent period of time indicated an UOP activity higher by several units for the catalyst of Example 1 for equivalent or slightly lower addition rates. Taken with its lower cost, the catalyst of Example 1 was much more economical in producing comparable yields.

In a commercial cracking operation, the coke made after introduction of the catalyst of Example 1 dropped in spite of the fact that iron, nickel and vanadium were gradually increasing to higher levels during the period the catalyst was employed. In this same period, there was a considerable drop in hydrogen production when the catalyst of Example 1 was introduced—indicating a better resistance to metals poisoning than the catalyst used prior thereto.

Thus, the catalyst prepared in accordance with the above disclosure offer to the industry several important advantages. These advantages include more economical methods of production without sacrifice of catalyst quality and in some respects significant improvements are obtained.

The invention is hereby claimed as follows:

1. A process for the preparation of a silica-alumina hydrogel containing kaolinite particles incorporated in said hydrogel which comprises the steps of forming an aqueous slurry of kaolinite, peptizing said kaolinite in said slurry by the addition thereto of a small amount of peptizing agent for said kaolinite, mixing said slurry of peptized kaolinite with an aqueous sodium silicate solution, adding to said sodium silicate solution a sufficient quantity of sulfuric acid to form a silica hydrogel, forming an alumina hydrogel in the aqueous system of said silica hydrogel, and drying the resultant silica-alumina hydrogel to provide a silica-alumina hydrogel catalyst containing kaolinite particles.

2. A process for the preparation of a silica-alumina hydrogel containing kaolinite particles incorporated in said hydrogel which comprises the steps of forming an aqueous slurry of kaolinite, peptizing said kaolinite in said slurry by the addition thereto of a small amount of sodium silicate, mixing said slurry of peptized kaolinite with an aqueous sodium silicate solution, adding to said sodium silicate solution a sufficient quantity of sulfuric acid to form a silica hydrogel, forming an alumina hydrogel in the aqueous system of said silica hydrogel, and spray drying the resultant aqueous silica-alumina hydrogel containing kaolinite into the microspherical particles.

3. In the manufacture of silica-alumina hydrogel catalysts containing kaolinite, the steps comprising forming an aqueous slurry by adding finely divided kaolinite to water and agitating the mixture, peptizing the kaolinite in said slurry by mixing in said slurry a small amount of a peptizing agent for said kaolinite, mixing with said slurry of peptized kaolinite an aqueous solution of sodium silicate to provide a concentration of sodium silicate, based on the weight of the aqueous system exclusive of said kaolinite, of 4 to 6%, expressed as $SiO_2$, adding to the slurry containing said sodium silicate, said slurry being at a temperature in the range of 80 to 122° F., sufficient sulfuric acid solution, preheated to 130 to 190° F., to lower the pH of the slurry to a value in the range 7.0 to 9.5, to cause the silica in said slurry to gel, aging the mixture for at least 30 minutes after the silica initially gels, adding to the gelled mixture an alum solution and then a sodium aluminate solution in proportions of alum and sodium aluminate giving a pH of the system a value in the range 4.5 to 6.0, whereby an alumina gel is formed, and thereafter spray drying said aqueous hydrogel system containing kaolinite dispersed therein, the quantity of kaolinite in said hydrogel being 30 to 60% of the total kaolinite and silica-alumina hydrogel, on a dry basis.

4. In the manufacture of silica-alumina hydrogel catalysts containing kaolinite, the steps comprising forming an aqeous slurry by adding finely divided kaolinite to water and agitating the mixture, peptizing the kaolinite in said slurry by mixing in said slurry a small amount of a sodium silicate solution, mixing with said slurry of peptized kaolinite an aqueous solution of sodium silicate to provide a concentration of sodium silicate, based on the weight of the aqueous system exclusive of said kaolinite, of 4 to 6%, expressed as $SiO_2$, adding to the slurry containing said sodium silicate, said slurry being at a temperature in the range of 80 to 122° F., sufficient sulfuric acid solution, preheated to 130 to 190° F., to lower the pH of the slurry to a value in the range 7.0 to 9.5, to cause the silica in said slurry to gel, aging the mixture for at least 30 minutes after the silica initially gels, adding to the gelled mixture an alum solution and then a sodium aluminate solution in proportions of alum and sodium aluminuate giving a pH of the system a value in the range 4.5 to 6.0, whereby an alumina gel is formed, and thereafter spray drying said aqueous hydrogel system containing kaolinite dispersed therein, the quantity of kaolinite in said hydrogel being 30 to 60% of the total kaolinite and silica-alumina hydrogel, on a dry basis.

5. A process for dispersing finely divided kaolinite particles in water which comprises mixing finely divided kaolinite particles in water and peptizing said kaolinite particles in said water by adding to said water a small amount of sodium silicate in the range of about 0.1–0.8% of said kaolinite particles, the latter being on a dry basis.

References Cited in the file of this patent

UNITED STATES PATENTS

| | | |
|---|---|---|
| 2,487,065 | Milliken | Nov. 8, 1949 |
| 2,669,547 | Shabaker | Feb. 16, 1954 |

UNITED STATES PATENT OFFICE
CERTIFICATE OF CORRECTION

Patent No. 3,034,995

May 15, 1962

David G. Braithwaite et al.

It is hereby certified that error appears in the above numbered patent requiring correction and that the said Letters Patent should read as corrected below.

Column 2, line 24, for "hydrogen" read -- hydrogel --; column 5, line 66, for "300° F." read -- 400° F. --; column 6, line 73, for "charge" read -- change --; column 7, line 10, for "made" read -- make --; column 8, line 38, for "aluminuate" read -- aluminate --.

Signed and sealed this 25th day of September 1962.

(SEAL)
Attest:

ERNEST W. SWIDER
Attesting Officer

DAVID L. LADD
Commissioner of Patents